(12) United States Patent
Infiesto et al.

(10) Patent No.: US 6,390,920 B1
(45) Date of Patent: May 21, 2002

(54) VEHICLE ENTERTAINMENT SYSTEM HAVING SEAT CONTROLLER CARDS PROGRAMMED TO OPERATE AS BOTH BROWSER AND SERVER

(75) Inventors: Douglas C. Infiesto, Chino Hills; David Frankenbach, La Habra Heights, both of CA (US); Joseph Winston, Morristown, NJ (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/335,976

(22) Filed: Jun. 18, 1999

(51) Int. Cl.[7] .................................................. A63F 13/00
(52) U.S. Cl. .................................. 463/42; 701/1; 348/8; 455/6.3
(58) Field of Search ............................... 463/39, 40, 41, 463/42, 43, 44, 3; 360/131; 369/63, 272; 701/200, 208; 348/8; 455/6.3

(56) References Cited

U.S. PATENT DOCUMENTS

| | | | |
|---|---|---|---|
| 5,555,466 A | * 9/1996 | Scribner et al. | 348/8 |
| 5,640,297 A | * 6/1997 | Labaze | 361/683 |
| 5,732,074 A | * 3/1998 | Spaur et al. | 370/313 |
| 5,794,164 A | * 8/1998 | Beckert et al. | 701/1 |
| 5,964,830 A | * 10/1999 | Durrett | 709/200 |
| 6,009,363 A | * 12/1999 | Beckert et al. | 701/33 |
| 6,014,381 A | * 1/2000 | Troxel et al. | 370/395 |
| 6,097,316 A | * 8/2000 | Liaw et al. | 340/988 |
| 6,148,253 A | * 11/2000 | Taguchi et al. | 701/48 |
| 6,185,491 B1 | * 2/2001 | Gray et al. | 701/36 |
| 6,246,688 B1 | * 6/2001 | Engwin et al. | 370/341 |

OTHER PUBLICATIONS

U.S. Patent application Ser. No. 09/085,180, filed May 26, 1998, Infiesto et al.

* cited by examiner

*Primary Examiner*—Michael O'Neill
(74) *Attorney, Agent, or Firm*—Nathan O. Jensen; Kyle Eppele

(57) ABSTRACT

A vehicle entertainment system includes seat controller cards (SCCs), each being programmed with a browser and operating as a microserver for managing Hyper-Text Transfer Protocol (HTTP) document requests issued by the browser. When the browser requests HTTP documents that are stored in a local memory of the SCC, the microserver retrieves the HTTP document from the local memory and provides it to the browser without accessing a system file server for the vehicle entertainment system. As a result, the processing load of the system file server is decreased and the response rate to a HTTP document request is increased.

20 Claims, 4 Drawing Sheets

VEHICLE ENTERTAINMENT SYSTEM HAVING SEAT CONTROLLER CARDS PROGRAMMED TO OPERATE AS BOTH BROWSER AND SERVER

REFERENCE TO RELATED APPLICATION

This application is related to, and being filed concurrently with, an application by Douglas Infiesto, entitled "Vehicle Entertainment System Having Built-In Test Environment Server," Ser. No. 09/336,638 the contents of which are incorporated herein.

BACKGROUND OF THE INVENTION

1. Field of the Invention

The present invention relates to a vehicle entertainment system, and more particularly, to a vehicle entertainment system in which each passenger seat is provided with a seat controller card that is programmed as a server to manage hypertext document requests locally, without accessing a server for the vehicle entertainment system.

2. Description of the Related Art

Hypertext documents are computer files containing text and images with links, more commonly referred to as hyperlinks, to other hypertext documents. The coding language that is used to create hypertext documents is known as HyperText Markup Language (HTML). The protocol for moving hypertext documents across an interconnected network of computers, e.g., across the Internet or an intranet, is known as HyperText Transport Protocol (HTTP). This protocol requires an HTTP client program on one end and an HTTP server program on the other end. The HTTP client program is known as a browser. It is the software that displays hypertext documents and manages inputs thereto. The two most popular types of browsers are Netscape Navigators9 and Internet Explorers9. The communications protocol that is used in the interconnected network of computers, e.g., the Internet or intranet, is Transmission Control Protocol/Internet Protocol (TCP/IP).

Each hypertext document has an address associated therewith. This address is known as a Uniform Resource Locator (URL). Generally, a user requests hypertext documents using the browser by either typing in the URL, or by maneuvering a cursor to a position on the displayed hypertext document that corresponds to a hyperlink to the URL and actuating the mouse button. The latter method is commonly referred to simply as "clicking on the hot-spot" or "clicking on the hyperlink." When the user types in the URL or clicks on the hyperlink, the browser transmits the URL corresponding to the requested hypertext document to an HTTP server computer in which the requested hypertext document resides. The server computer retrieves this document and transmits it back to the browser.

Although the URL is typically associated with a hypertext document, it may be associated with an executable program instead. If a URL that is associated with an executable program is specified by a browser, the server computer in which the executable program resides executes the program using any input data received from the browser, and the output of the program is transmitted back to the browser, typically in the form of a hypertext document.

An in-flight entertainment (IFE) system providing Internet or intranet access is proposed in co-pending U.S. patent application Ser. No. 09/085,180, filed May 26, 1998, entitled "Passenger Entertainment System, Method and Article of Manufacture Having Improved Area Distribution Equipment," the contents of which are incorporated by reference herein. In this system, client computing capabilities are provided at every seat by equipping each seat with an input device (a passenger control unit and a touch screen), an output device (a display unit), and a processor programmed with a browser. The connection to the Internet is provided by a satellite uplink and downlink. The system may also function as an airborne intranet to permit the passenger to select and control product ordering services, passenger services, and entertainment and communications services without connecting to the Internet.

When providing either Internet or intranet access, the above-described system employs a system file server, which is referred to as a cabin file server (CFS) in an IFE system. In the case of Internet access, the CFS functions as a proxy server to manage the connections to other server computers over the Internet. In the case of intranet access, the CFS functions as an HTTP server computer to directly manage requests for hypertext documents and program executions.

However, the CFS also functions as the system controller for the IFE system and is programmed to perform other tasks associated with managing the IFE system. As a result, when the CFS is busy with system-related tasks, response rates to a request for hypertext documents and program executions may be unacceptably slow. Also, it is possible that several requests for hypertext documents and program executions may reach the CFS at about the same time. In such a case, the requests will have to be queued, causing further response delays. Further, if the CFS is down for maintenance or repair, the CFS will be unable to process any pending requests until the maintenance or repair has been completed.

SUMMARY OF THE INVENTION

An object of the invention is to improve the response rates to a request for hypertext documents and program executions in a vehicle entertainment system.

Another object of the invention is to decrease the processing load at a system file server of the vehicle entertainment system so that the system file server will have more processing power to perform system-related tasks and manage Internet connections and intranet server functions.

Still another object of the invention is to permit passengers of a vehicle entertainment system to select and control passenger, entertainment, and communications services using a browser interface without reliance on either an Internet or intranet connection.

The above and other objects of the invention are achieved with a vehicle entertainment system having a system file server connected to a plurality of seat controller cards (SCCs), wherein each SCC is programmed with a browser and an HTTP server program to operate as a server for managing hypertext document requests issued by the browser. When the browser requests hypertext documents that are stored in a local memory of the SCC, the server retrieves the hypertext document from the local memory and provides it to the browser without accessing the system file server for the vehicle entertainment system. As a result, the response rate to a hypertext document request is increased, and the processing load of the system file server is decreased. The decrease in the processing load of the system file server leaves it with more processing power to execute system-related tasks and to perform more effectively as a proxy and/or intranet server. Also, each SCC is considered a micro-network (micronet, for short) because it performs the functions of both the client computer (by being programmed with a browser) and the server computer (by being programmed as an HTTP server).

Each SCC is programmed as a micronet because many of the services that are requested using the browser may be handled without connecting to the Internet or accessing the intranet server. For example, when a passenger selects a movie for viewing on his or her display unit through the browser, the SCC provided at his or her passenger seat is tuned to the channel that is carrying the selected movie. The tuning of the SCC to a particular channel is a local task and need not require participation by the system file server either as an Internet proxy server or an intranet server. However, in an IFE system in which the system file server is set up as an Internet proxy server or an intranet server, the request is always transmitted to the system file server and the system file server executes the program for tuning the SCC to the particular channel. In the invention, the SCC is configured as a micrnoet having a browser and a server and the executable program for tuning the SCC resides in the local memory of the SCC, so that the channel selection request made with the micronet browser is carried out locally by the micronet server without involvement by the system file server of the vehicle entertainment system.

Additional objects, features and advantages of the invention will be set forth in the description of preferred embodiments which follows.

BRIEF DESCRIPTION OF THE DRAWINGS

The various features and advantages of the present invention may be more readily understood with reference to the following detailed description taken in conjunction with the accompanying drawings, and in which.

The accompanying drawings, which are incorporated in and constitute a part of the specification, illustrate presently preferred exemplary embodiments of the invention, and, together with the general description given above and the detailed description of the preferred embodiments given below, serve to explain the principles of the invention.

DETAILED DESCRIPTION OF THE PREFERRED EMBODIMENTS

In the description provided below, a description of some of the details of a vehicle entertainment system has been omitted for clarity. Such details may be found in the co-pending U.S. patent application Ser. No. 09/085,180. Further, although an aircraft is depicted, the system according to the invention may be implemented in any vehicle having a passenger entertainment system. Some of the examples include buses, boats, trains, and jetfoils.

Figure 1:
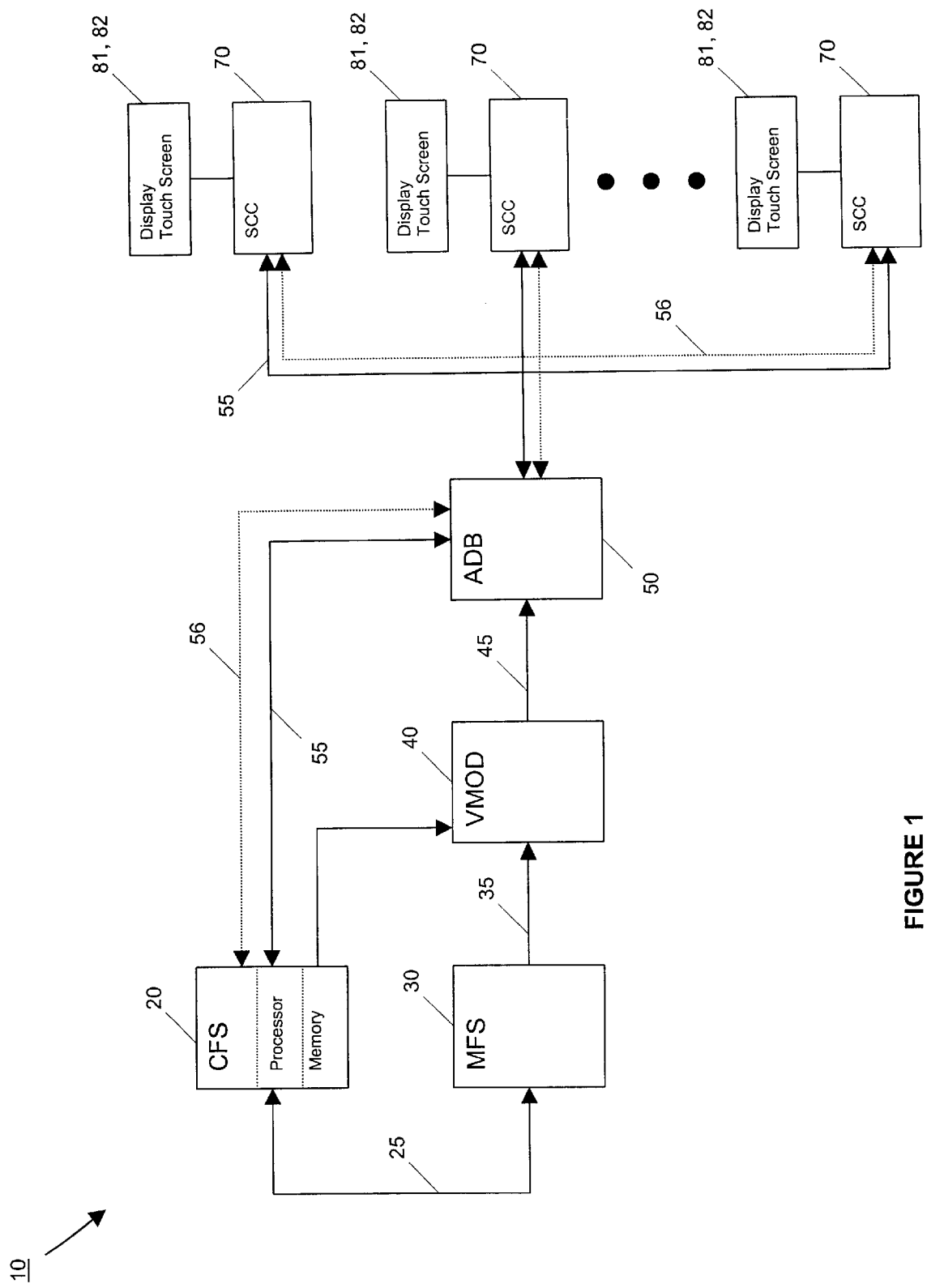
FIG. 1 is a block diagram of a networked IFE system.

FIG. 1 is a block diagram of an in-flight entertainment (IFE) system 10 operating in an intranet environment. The intranet server computer includes a cabin file server (CFS) 20 and the client computers include seat controller cards (SCCs) 70 each having a processor 71 (see FIG. 3) that is programmed with a browser and connected to a display 81 and a touch screen 82. Hypertext documents are displayed on the display 81 and a passenger provides inputs using the touch screen 82. A RF cable network 55 connects the CFS 20 to the SCCs 70.

Figure 2:
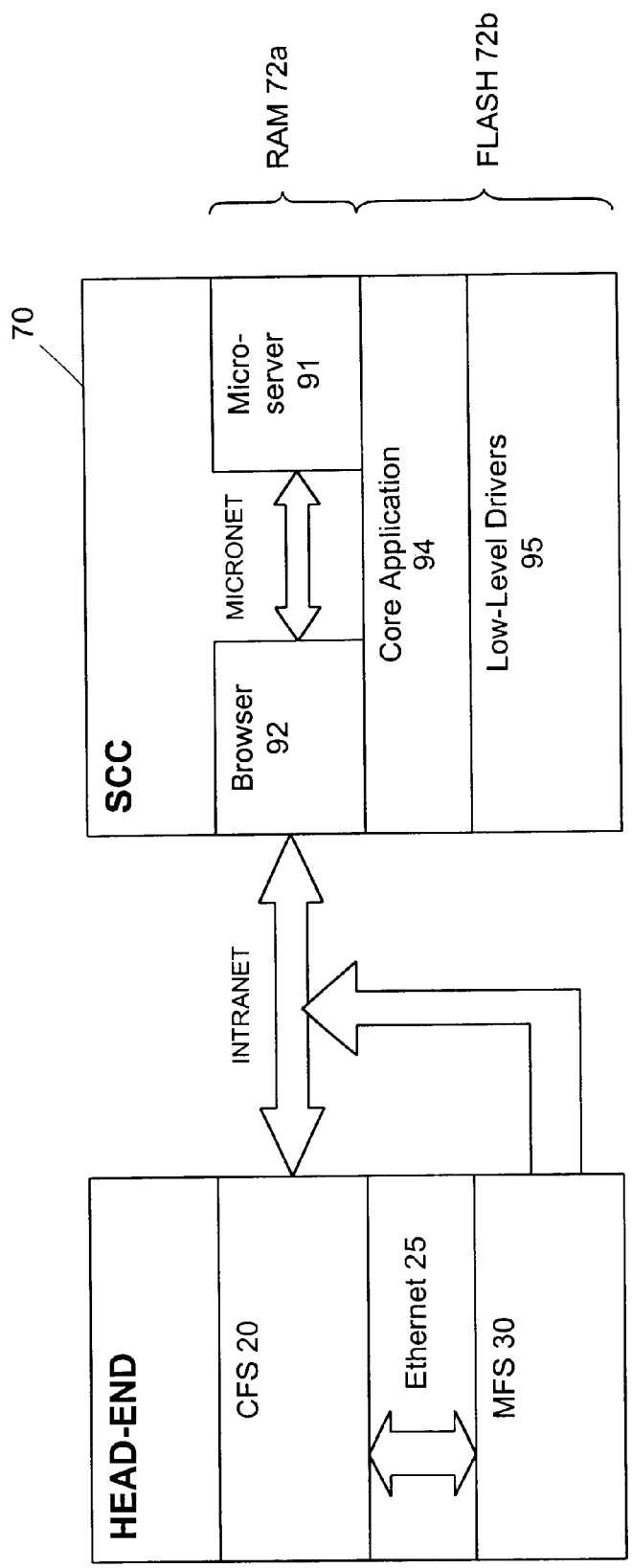
FIG. 2 illustrates software components of a system file server and a seat controller card of the IFE system according to FIG. 1.

In the IFE system 10, a plurality of micronets are configured within the intranet environment. A micronet is illustrated in FIG. 2. It constitutes an HTTP connection between a microserver 91, which operates as the HTTP server program, and a browser 92, which operates as the HTTP client program. The intranet, by contrast, constitutes an HTTP connection between the CFS 20, which operates as the intranet server, and the browser 92. The communications protocol for both the intranet and the micronet is TCP/IP.

The microserver 91 and the browser 92 are two software components of the SCC 70. The microserver 91 constitutes a processor 71 programmed with an HTTP server program and the browser 92 constitutes the processor 71 running an HTTP browser program such as Netscape Navigator9 and Internet Explorer9. The microserver 91 and the browser 92 are preferably stored in a random access memory (RAM) 72a.

The other software components of the SCC 70 include a core application 94 and low-level drivers 95. The core application 94 includes an operating system for the SCC 70 and an application software for managing the low-level drivers 95. The low-level drivers 95 control the hardware components of the SCC 70 and external equipment under control of the passenger, such as overhead lights, headphones, attendant call switch, etc. The core application 94 and the low-level drivers are stored in a flash memory 72b.

Figure 3:
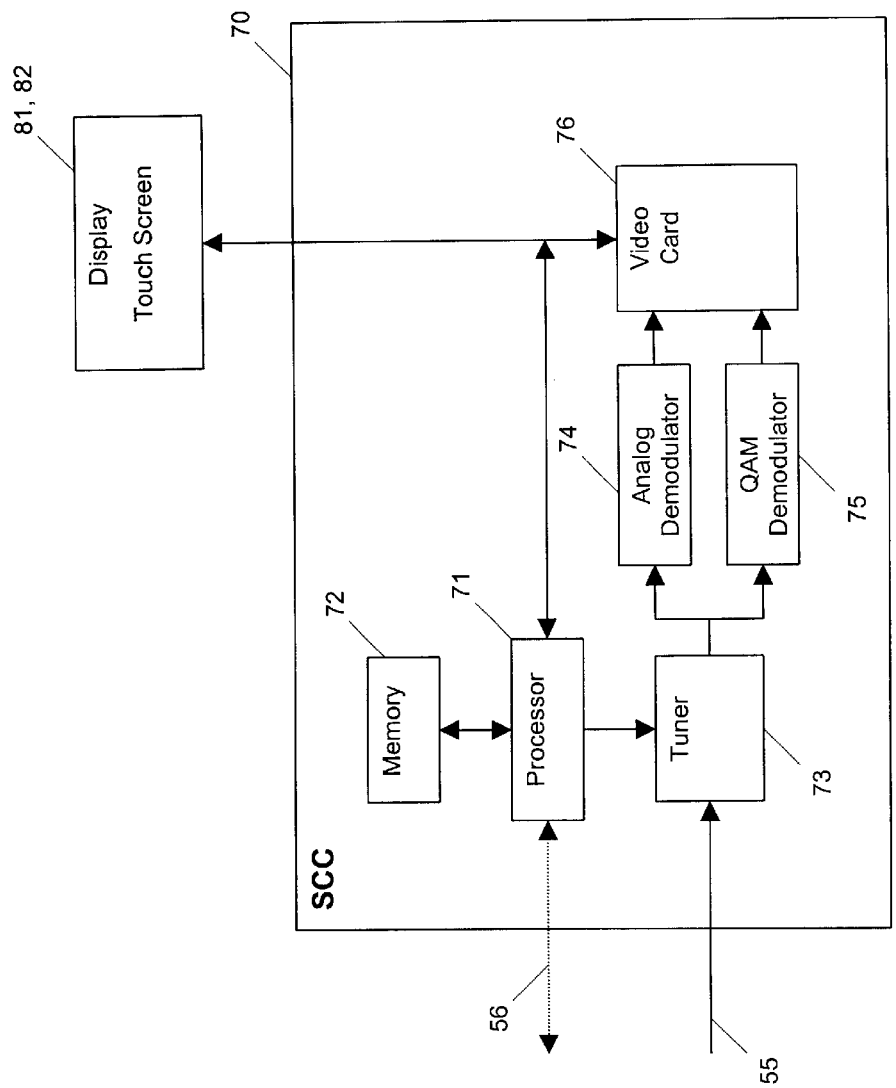
FIG. 3 is a block diagram of a seat controller card of the networked IFE system.
Figure 4:
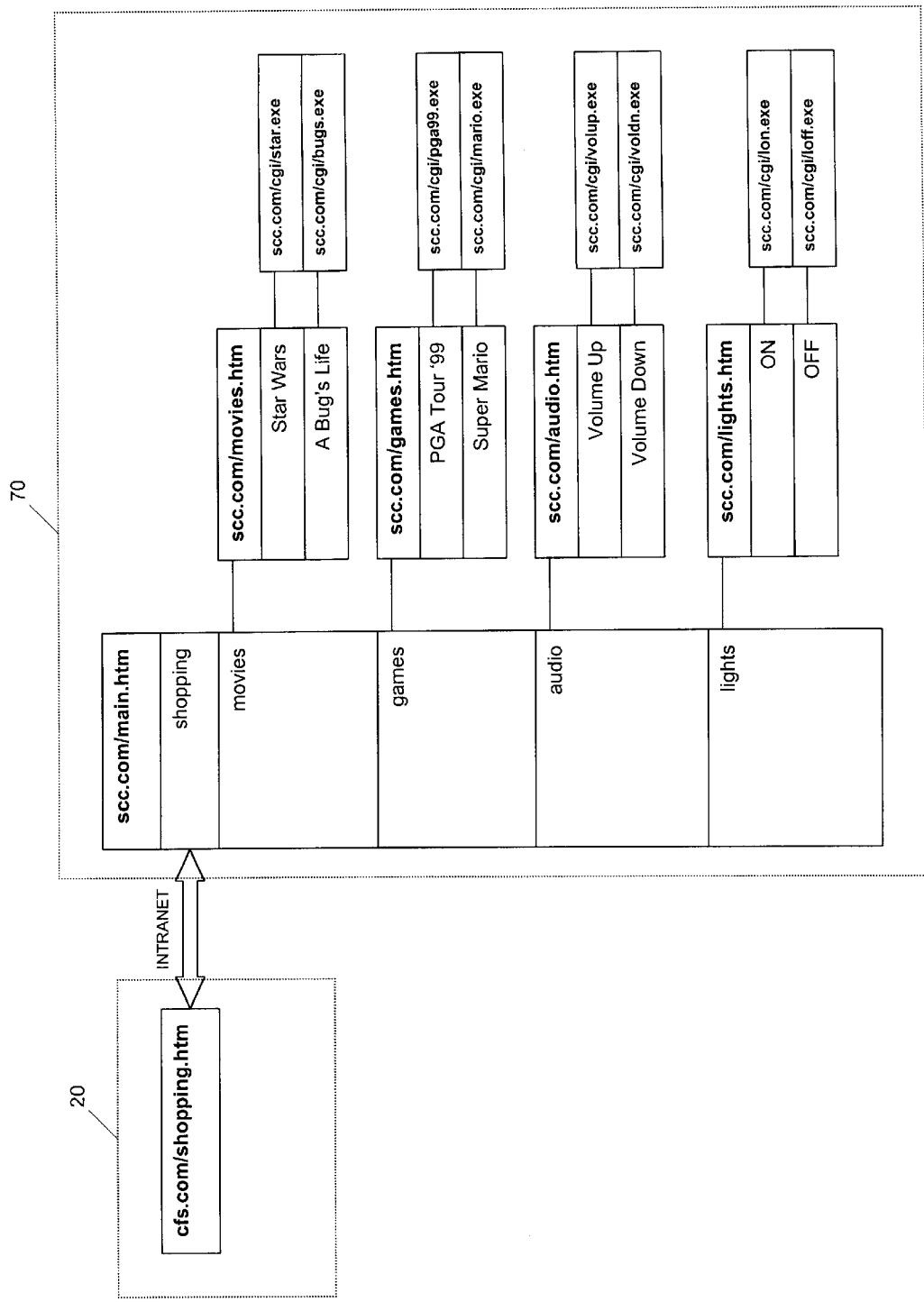
FIG. 4 is a diagram illustrating hypertext documents and executable programs that are stored locally in a seat controller card of the networked IFE system.

The RAM 72a and the flash memory 72b are represented as a memory 72 in FIG. 3. The RAM 72a further stores hypertext documents and executable programs that are managed by the microserver 91. They include the home page of the microserver 91 with the URL "scc.com/main.htm" and all other hypertext documents and executable programs having the URL "scc.com" as the root address. Some example of such hypertext documents and executable programs are illustrated in FIG. 4.

FIG. 1 also illustrates a media file server 30, a video modulator 40, and an area distribution box 50. The media file server 30 is connected to the CFS 20 by an ethernet connection 25. When a passenger requests a hypertext document stored and managed by the CFS 20 or the CFS outputs a hypertext document upon executing a program requested by the passenger, the hypertext document is transmitted to the media file server 30 from the CFS 20 over the ethernet connection 25. The media file server 30 includes quadrature amplitude modulation (QAM) circuit to modulate the transmitted data using QAM to produce QAM radio frequency (RF) signals. The QAM RF signals are then supplied to the video modulator 40 over an RF cable 35.

The video modulator 40 is a device that receives multiple RF inputs and modulates the multiple RF inputs into a single RF signal having multiple RF channels. Only the inputs from the CFS 20 and media file server 30 is shown in FIG. 1 for clarity. The video modulator 40 actually receives multiple inputs from the media file server 30 in addition to other inputs from other devices, such as video cassette players (not shown). The multi-channel RF signal is supplied to the area distribution box 50 over an RF cable 45 and the area distribution box distributes the multi-channel RF signal to the SCCs 70 over the RF cable network 55. A plurality of attenuators and amplifiers (not shown) are arranged in the RF cable network 55 to automatically optimize signal quality under software control.

At the SCCs 70, a tuner 73 (see FIG. 3) is used to extract a desired channel from the multi-channel RF signal and the extracted signal is either demodulated using an analog demodulator 74 or a QAM demodulator 75. The demodulated output is supplied to a video card 76 which controls the display 81 to display the demodulated output. In addition to the RF cable network 55, a token passing bus network 56 using RS-485 protocol, known as ARCNET, is used to pass control signals between the CFS 20 and the SCCs 70. The ARCNET network 56 is illustrated in FIG. 1 in dotted lines. Through this network, the CFS 20 informs the SCC 70 of the RF channel in which a requested hypertext document or a hypertext output of requested program is contained so that the RF channel can tune to that channel to receive that document. This network 56 is also used to transmit browser requests from the SCC 70 to the CFS 20.

Although the IFE system 10 of FIG. 1 is illustrated as operating in an intranet environment, it may be configured to also have access to the Internet by way of a satellite uplink and downlink in the manner shown in the co-pending U.S. patent application Ser. No. 09/085,180. In such a system, the CFS 20 operates as a proxy server when a URL that is not part of the intranet or the micronet is accessed, e.g., URL that does not have the root address "scc.com" or the root address "cfs.com."

The operation of the IFE system 10 of FIG. 1 will now be explained with reference to FIG. 4. Upon power-up of the aircraft in which the IFE system 10 is implemented, the hypertext documents and executable programs having the root address "scc.com" are downloaded from the CFS 20 and stored in the RAM 72a. Next, the home page of the microserver 91 which has the address "scc.com/main.htm" is displayed on the display 81 to the passenger. The passenger, using the touch screen 82, specifies a selection from one of shopping, movies, games, audio, and lights, each of which is hyperlinked to a hypertext document.

The hypertext document associated with shopping is not resident in the SCC 70 so if the passenger clicks on this hyperlink, a request for the hypertext document "cfs.com/shopping.htm" is issued to the CFS 20 over the ARCNET network 56. The CFS 20 retrieves this hypertext document and supplies it to the media file server 30 over the ethernet connection 25. The media file server 30 modulates the requested hypertext document using QAM and supplies the QAM output to the video modulator 40. The media file server 30 also informs the CFS 20 as to which input channel of the video modulator 40 that it used to supply the QAM output. The multi-channel RF signal including the requested hypertext document in one of the RF channels is generated by the video modulator 40 and distributed to the SCCs 70 by the area distribution box 50 over the RF cable network 55. The CFS 20 also informs the requesting SCC 70 of the channel containing the requested hypertext document over the ARCNET network 56 and the requesting SCC 70 tunes to that channel, demodulates the RF signal received over that channel, and displays the requested hypertext document.

If, on the other hand, the passenger clicks on a hyperlink associated with movies, games, audio, or lights, the hypertext document request is issued over the micronet to the microserver 91. For example, if the hypertext document associated with movies is requested, the browser 92 sends that request to the microserver 91, which retrieves the requested hypertext document from the RAM 72a and transmits it over the micronet back to the browser 92 for display. Upon display of the hypertext document "scc.com/movies.htm," the passenger is prompted with a selection between two movies, "Star Wars" and "A Bug's Life." Each selection has an executable program associated therewith. The executable programs are also stored in the RAM 72a. If "A Bug's Life" is selected, the browser sends a request to execute the URL "scc.com/cgi/bugs.exe" over the micronet to the microserver 91. The microserver 91 retrieves the program "scc.com/cgi/bugs.exe" and executes it to cause the tuner 73 to tune to the channel playing that movie. Also, a hypertext document may be generated and returned to the browser 92 over the micronet to display a confirmation message.

Similarly, if the hypertext document associated with games is requested, the browser 92 sends that request to the microserver 91, which retrieves the requested hypertext document from the RAM 72a and transmits it over the micronet back to the browser 92 for display. Upon display of the hypertext document "scc.com/games.htm," the passenger is prompted with a selection between two games, "PGA Tour '99" and "Super Mario." Each selection has an executable program associated therewith. The executable programs are also stored in the RAM 72a. If "PGA Tour '99" is selected, the browser sends a request to execute the URL "scc.com/cgi/pga99.exe" over the micronet to the microserver 91. The microserver 91 retrieves the program "scc.com/cgi/pga99.exe" and executes a series of program instructions to download the game software into memory 72 and start the game software. Also, a hypertext document may be generated and returned to the browser 92 over the micronet to display a confirmation message.

If the hypertext document associated with audio is requested, the browser 92 sends that request to the microserver 91, which retrieves the requested hypertext document from the RAM 72a and transmits it over the micronet back to the browser 92 for display. Upon display of the hypertext document "scc.com/audio.htm," the passenger is prompted with a selection between "Volume Up" and "Volume Down." Each selection has an executable program associated therewith. The executable programs are also stored in the RAM 72a. If "Volume Up" is selected, the browser sends a request to execute the URL "scc.com/cgi/volup.exe" over the micronet to the microserver 91. The microserver 91 retrieves the program "scc.com/cgi/volup.exe" and executes a series of program instructions to increase the volume on the headset. Also, a hypertext document may be generated and returned to the browser 92 over the micronet to display a confirmation message. Similarly if "Volume Down" is selected, the microserver 91 executes a series of program instructions to decrease the volume on the headset.

If the hypertext document associated with lights is requested, the browser 92 sends that request to the microserver 91, which retrieves the requested hypertext document from the RAM 72a and transmits it over the micronet back to the browser 92 for display. Upon display of the hypertext document "scc.comllights.htm," the passenger is prompted with a selection between "ON" and "OFF." Each selection has an executable program associated therewith. The executable programs are also stored in the RAM 72a. If "ON" is selected, the browser sends a request to execute the URL "scc.com/cgi/lon.exe" over the micronet to the microserver 91. If "OFF" is selected, the browser sends a request to execute the URL "scc.com/cgi/loff.exe" over the micronet to the microserver 91. The microserver 91 retrieves the appropriate program and executes a series of program instructions to turn ON or OFF the overhead light. Also, a hypertext document may be generated and returned to the browser 92 over the micronet to display a confirmation message.

A description of a single SCC 70 and a single micronet resident in the SCC 70 has been provided above for clarity. The description of the single SCC 70 and its respective micronet is, however, representative of all other SCCs 70 of the IFE system 10. When all of the SCCs 70 are considered, the resulting IFE system 10 will include a plurality of micronets interconnected over the RF cable and ARCNET networks 55, 56. Also, each SCC 70 will have its own unique address. The URLs of the different SCCs 70 may be distinguished from one another by using a numerical suffix "###" to form the address "scc###.com."

While particular embodiments according to the invention have been illustrated and described above, it will be clear that the invention can take a variety of forms and embodiments within the scope of the appended claims.

We claim:

1. A vehicle entertainment system for a vehicle, comprising:
   a system file server disposed in the vehicle for storing a plurality of files and providing a connection with an external network for retrieving files from sources external to the vehicle; and
   a plurality of seat controller cards (SCCs) connected to the system file server, each of the SCCs having a processor and a local memory and being connected to a display unit and an input device,
   wherein the local memory has stored therein a plurality of files and the processor is programmed with a browser for displaying the files on the display unit and for requesting the files as specified by the input device, and
   wherein the processor is further programmed as a local server to retrieve the files requested by the browser from the local memory and to deliver the requested files to the browser without accessing the system file server; and
   wherein the processor is further programmed for accessing the system file server for retrieving files stored on system file server or retrieved via the external network if the files are not present in the local memory.

2. The vehicle entertainment system according to claim 1, wherein the browser and the local server communicate with each other using Transmission Control Protocol/Internet Protocol.

3. The vehicle entertainment system according to claim 2, wherein the plurality of files comprise a plurality of HTML (Hyper-Text Markup Language) files.

4. The vehicle entertainment system according to claim 3, wherein each HTML file has an address and the browser requests an HTML file by transmitting an address of that HTML file to the local server.

5. The vehicle entertainment system according to claim 4, wherein the system file server has stored therein a plurality of HTML files, such that when an HTML file stored in the system file server is requested, the browser transmits a request for the HTML file to the system file server which retrieves the HTML file and delivers the HTML files to the browser for display on the display unit, but when an HTML file stored in the local memory is requested, the browser transmits a request for the HTML file to the local server which retrieves the HTML file from the local memory and delivers the HTML file to the browser for display without accessing the system file server.

6. The vehicle entertainment system according to claim 2, wherein the local memory has stored therein an executable program that is retrieved by the server and executed when a request for the executable program is made with the input device using the browser.

7. The vehicle entertainment system according to claim 6, wherein the executable program includes a set of program instructions to turn ON/OFF an overhead light.

8. The vehicle entertainment system according to claim 6, wherein the executable program includes a set of program instructions to increase/decrease the volume on a passenger headset.

9. A seat controller card (SCC) for a vehicle entertainment system connected to a system file server of the vehicle entertainment system, a display unit and an input device, the SCC comprising:
   a memory having stored therein a plurality of files; and
   a processor programmed with a browser for displaying files on the display unit and for requesting files as specified by the input device,
   wherein the processor is further programmed as a server to retrieve files requested by the browser from the memory, to access the system file server for retrieving files stored on the system file server if those files are not stored in the memory and to deliver the requested files to the browser,
   wherein the browser and the server communicate with each other using Transmission Control Protocol/Internet Protocol.

10. The SCC according to claim 9, wherein the plurality of files comprise a plurality of HTML (Hyper-Text Markup Language) files.

11. The SCC according to claim 10, wherein each HTML file has an address and the browser requests an HTML file by submitting an address of that HTML file to the server.

12. The SCC according to claim 9, wherein the memory has stored therein an executable program that is retrieved by the server and executed by the processor when a request for the executable program is made with the input device using the browser.

13. The SCC according to claim 12, wherein the executable program includes a set of program instructions to select an audio/video channel.

14. A method of providing an intranet in a vehicle entertainment system having a system file server and a plurality of seat controller cards (SCCs) connected to the system file server, wherein the system file server has stored therein a plurality of files, and each seat controller card has a processor and a memory and is connected to a display unit and an input device, said method comprising the steps of:
   programming the processor of each SCC with a browser for displaying the files on the display unit and for requesting the files as specified by the input device; and
   storing a plurality of files in the memory of at least one SCC and programming the processor of said at least one SCC as a server to accept a file request from a browser, and if the requested file exists in the memory, to retrieve the requested file from the memory and deliver the requested file to the browser without accessing the system file server, but if the requested file does not exist in the memory, to retrieve the requested file from the system file server and deliver the requested file to the browser,
   wherein the server and the browser are programmed to communicate with each other using TCP/IP (Transmission Control Protocol/Internet Protocol).

15. The method according to claim 14, further comprising the step of storing in the memory of said at least one SCC an executable program that is retrieved by the server and executed by the processor of said at least one SCC when a request for the executable program is made with the input device using the browser.

16. The vehicle entertainment system according to claim 15, further comprising the step of executing a set of program instructions to select an audio/video channel in response to the executable program request.

17. A vehicle entertainment system for a vehicle, comprising:

a system file server disposed in the vehicle for storing a plurality of hypertext documents and providing a connection with an external network for retrieving hypertext documents from sources external to the vehicle; and a plurality of seat controller cards (SCCs) connected to the system file server, wherein the SCCs are programmed as a browser for transmitting hypertext document requests and as a local server for managing the hypertext documents requests, the requested hypertext documents being retrieved from a memory of the SCC if stored in the memory of the SCC and the system file server if not stored in the memory of the SCC so that access by the SCC to the system file server is limited.

18. The vehicle entertainment system according to claim 17, wherein the browser and the local server communicate with each other using TCP/IP (Transmission Control Protocol/Internet Protocol).

19. The vehicle entertainment system according to claim 18, wherein the browser and the local server uses HyperText Transport Protocol (HTTP) as the protocol for transporting hypertext documents therebetween.

20. The vehicle entertainment system according to claim 19, wherein the system file server has stored therein a plurality of hypertext documents, such that when a hypertext document stored in the system file server is requested, the browser transmits a request for the hypertext document to the system file server, but when a hypertext document stored locally in the SCC is requested, the browser transmits a request for the hypertext document to the local server.

* * * * *